(12) United States Patent
Mollet

(10) Patent No.: US 10,045,661 B2
(45) Date of Patent: Aug. 14, 2018

(54) DEVICE AND METHOD FOR COMPOSING SATAYS

(71) Applicant: SMO bvba, Eeklo (BE)

(72) Inventor: Sander Mollet, Adegem (BE)

(73) Assignee: SMO BVBA, Eeklo (BE)

( * ) Notice: Subject to any disclaimer, the term of this patent is extended or adjusted under 35 U.S.C. 154(b) by 120 days.

(21) Appl. No.: 14/646,291

(22) PCT Filed: Nov. 21, 2013

(86) PCT No.: PCT/IB2013/060300
§ 371 (c)(1),
(2) Date: May 20, 2015

(87) PCT Pub. No.: WO2014/080356
PCT Pub. Date: May 30, 2014

(65) Prior Publication Data
US 2015/0313407 A1    Nov. 5, 2015

(30) Foreign Application Priority Data

Nov. 21, 2012  (BE) .................................. 2012/0790

(51) Int. Cl.
*A47J 37/04* (2006.01)
*A22C 17/00* (2006.01)
*A23P 10/10* (2016.01)

(52) U.S. Cl.
CPC ............. *A47J 37/04* (2013.01); *A22C 17/006* (2013.01); *A23P 10/10* (2016.08)

(58) Field of Classification Search
CPC .......... A47J 37/04; A47J 37/00; A47J 37/042; A23P 1/005; A22C 17/006
USPC ........... 426/390, 421; 99/419, 421 A, 421 R, 99/421 HV, 421 HH; 3/390, 421
See application file for complete search history.

(56) References Cited

U.S. PATENT DOCUMENTS

| | | | | |
|---|---|---|---|---|
| 1,288,345 A | * | 12/1918 | Wills ....................... | C22C 38/22 148/908 |
| 1,534,338 A | * | 4/1925 | Weihmann ........... | A23G 7/0031 29/241 |
| 2,379,239 A | * | 6/1945 | Krebs ................... | A47J 37/041 126/14 |
| 2,477,529 A | * | 7/1949 | Sprinkle ............. | A47J 37/0763 126/14 |

(Continued)

FOREIGN PATENT DOCUMENTS

EP    2048960 A1    4/2009
FR    2929079    *    3/2008 ............. A22C 17/00

(Continued)

*Primary Examiner* — Jimmy Chou
(74) *Attorney, Agent, or Firm* — Knobbe, Martens, Olson & Bear LLP

(57) ABSTRACT

A device for composing a series of satays, comprising a series of separate holders (8), wherein each holder is provided with a series of recesses, a horizontal frame (4) and a vertical frame (5), wherein the horizontal frame is suitable for horizontally moving the holders up to the vertical frame, wherein the vertical frame is suitable for separately moving each holder vertically upwards, wherein the holders are kept in a horizontal position. The present invention also relates to a method for composing a series of satays.

12 Claims, 6 Drawing Sheets

(56) References Cited

U.S. PATENT DOCUMENTS

| | | | | |
|---|---|---|---|---|
| 2,815,530 A * | 12/1957 | Alexander | A22C 17/006 | 426/421 |
| 3,068,852 A * | 12/1962 | Purtzer | A47J 37/0763 | 108/33 |
| 3,182,585 A * | 5/1965 | Rensch | A47J 37/0731 | 126/14 |
| 3,535,999 A * | 10/1970 | Chambon | A47J 37/041 | 99/340 |
| 3,611,912 A * | 10/1971 | Choc | A47J 37/0718 | 126/25 R |
| 3,741,103 A * | 6/1973 | Hwag | A47J 37/0704 | 99/421 A |
| 4,324,174 A * | 4/1982 | Conradt | A47J 37/0786 | 126/9 R |
| 4,429,435 A * | 2/1984 | Walls | A22C 17/006 | 99/419 |
| 4,619,190 A * | 10/1986 | Smith | A47J 37/0718 | 126/25 A |
| 4,878,476 A * | 11/1989 | Oliphant | A47J 37/0763 | 126/25 R |
| 4,924,844 A * | 5/1990 | Bransburg | A47J 37/0718 | 126/37 R |
| 4,933,528 A * | 6/1990 | Barr | A47J 36/027 | 219/732 |
| 4,941,327 A * | 7/1990 | Miles | A47F 1/06 | 221/150 R |
| 5,001,971 A * | 3/1991 | Beller | A47J 37/041 | 99/419 |
| 5,100,366 A * | 3/1992 | Castens | A47J 43/18 | 452/198 |
| 5,127,319 A * | 7/1992 | Dolle | A22C 17/006 | 99/419 |
| 5,156,083 A * | 10/1992 | Leighton | A47J 37/0652 | 99/419 |
| 5,174,195 A * | 12/1992 | Anderson | A22C 17/006 | 206/493 |
| 5,174,196 A * | 12/1992 | Cheatham | A22C 17/006 | 99/419 |
| 5,293,859 A * | 3/1994 | Lisker | A47J 37/0768 | 126/25 A |
| 5,359,840 A * | 11/1994 | Costar | A01D 51/00 | 172/378 |
| 5,518,127 A * | 5/1996 | Warmack | A47F 9/00 | 108/25 |
| 5,650,085 A * | 7/1997 | Chen | H05B 6/6408 | 219/732 |
| 5,887,513 A * | 3/1999 | Fielding | A47J 37/0694 | 99/419 |
| 5,996,820 A * | 12/1999 | Broadnax | A22C 15/007 | 211/125 |
| 6,474,224 B1 * | 11/2002 | Natter | A47J 37/0694 | 99/419 |
| 7,165,270 B2 * | 1/2007 | DeYoung | A41D 13/087 | 2/16 |
| 8,991,328 B2 * | 3/2015 | Farid | A23P 1/084 | 118/13 |
| 9,107,542 B1 * | 8/2015 | Al-Raqadi | A47J 43/18 | |
| 2004/0187701 A1 * | 9/2004 | Oi | A22C 17/006 | 99/419 |
| 2006/0174777 A1 * | 8/2006 | Roe | A22C 17/006 | 99/419 |
| 2006/0213373 A1 * | 9/2006 | Fernandez | A47J 37/0611 | 99/349 |
| 2009/0211936 A1 * | 8/2009 | Korff | A47G 19/08 | 206/459.5 |
| 2009/0311400 A1 * | 12/2009 | Allen | A47J 37/049 | 426/523 |
| 2012/0097046 A1 * | 4/2012 | Jones | A47J 37/0629 | 99/334 |
| 2012/0225174 A1 * | 9/2012 | DeAlto | A47J 37/041 | 426/421 |
| 2012/0255537 A1 * | 10/2012 | Kanwar | A47J 37/0704 | 126/25 AA |
| 2013/0075252 A1 * | 3/2013 | Wright | C25D 17/08 | 204/297.1 |
| 2013/0104744 A1 * | 5/2013 | Oi | A47J 37/0786 | 99/421 H |
| 2013/0247898 A1 * | 9/2013 | Balcerzak | A47J 37/0786 | 126/25 R |
| 2014/0030399 A1 * | 1/2014 | Farid | A23P 1/084 | 426/302 |
| 2014/0230665 A1 * | 8/2014 | Balcerzak | A47J 37/041 | 99/419 |
| 2015/0027322 A1 * | 1/2015 | Konde | A47J 37/041 | 99/421 H |
| 2015/0196162 A1 * | 7/2015 | Bou Habib | A47J 37/045 | 99/421 R |
| 2015/0208861 A1 * | 7/2015 | Azzam | A47J 37/041 | 99/395 |
| 2017/0065104 A1 * | 3/2017 | Metropulos | A47F 5/0087 | |

FOREIGN PATENT DOCUMENTS

| | | | |
|---|---|---|---|
| WO | WO 2008/017133 A1 | 2/2008 | |
| WO | WO 2008017133 A1 * | 2/2008 | A22C 17/006 |

* cited by examiner

DEVICE AND METHOD FOR COMPOSING SATAYS

TECHNICAL FIELD

The present invention relates to a device and method for composing satays.

BACKGROUND

Originally, satay is an Indonesian and Malaysian dish, consisting of three or more small pieces of roasted meat on a thin wooden skewer, usually made of bamboo or a wood-like material. The pieces of meat may be pieces of pork, beef, chicken, goat, prawns, etc.

Satay is produced by pushing several pieces of meat onto a skewer made of wood-like or metal material, if desired together with vegetables, such as onion or pepper between the successive pieces of meat. Subsequently, the satay is fried in a fat-like or oil-like means or grilled on a grill over a coal fire or log fire.

In addition, satays can be made by pushing other food items onto a skewer, such as for example sweets, cheese, fruit and the like.

Compiling satays may be executed manually. In view of the time-consuming character of manually compiling satays, automatic or semi-automatic appliances are desirable. Such devices are already known.

GB 2,442,871 describes a holder with various compartments for positioning pieces of meat and a facility for introducing a skewer. U.S. Pat. No. 4,429,435 describes a similar device to the one described in GB 2,442,871, in which various satays can be produced in parallel. However, composing satays is still carried out manually in this embodiment.

U.S. Pat. No. 5,100,366 describes a two-part cylindrical holder comprising several compartments in the longitudinal direction for fixing pieces of meat, wherein the compartments are provided with a central opening via which a skewer can be pushed through the pieces of meat. Analogously, a device is described in which such cylinders are fitted next to each other.

However, the drawback of such a device is that it is impossible to produce satays of different sizes or using different vegetables. In addition, the process is still very laborious, as the skewer has to be introduced manually. In addition, working with such a device requires a lot of assembly work.

To this end, EP 2,048,960 B1 describes a device for composing satays, comprising a number of holders which can be stacked and which are provided with at least a cup-shaped recess with an open and an opposite bottom, which has a passage for introducing a skewer in the direction of the stacking of the holder, wherein the holders are split once the satays have been formed, so that the satays can be released.

Such a machine makes it possible to fill the holder with different ingredients of different dimensions in a simple manner. In addition, skewering the food is much easier and the satays can be removed from the device in a simple manner once they have been produced. The assembly work can be limited and composing the satays is partly carried out automatically.

Despite the improvements which have been made regarding a device and method for composing satays, the following problems still exist.

Composing satays still requires many sequential and repetitive manual operations, as a result of which the time required to compose one satay and the associated use of workmen forms a limitation to industrial use.

In addition, the use of moving mechanical parts is an inherent threat to the operation of the device.

Furthermore, the need for frequent physical contact between the operative and the food items when preparing satays according to the known methods forms an inherent problem with regard to hygiene and therefore has to be limited.

SUMMARY OF THE INVENTION

The present invention provides a solution to at least one of the above-described problems by providing a construction and method for composing satays, as described in claims 1 and 12.

In a first aspect, the present invention provides a device for composing satays, being a series of food elements (3) penetrated by a skewer (2), comprising a series of separate holders (8), wherein each holder (8) is provided with a series of recesses (9) which are suitable for temporarily accommodating a food element meanwhile, a horizontal frame (4) and a vertical frame (5).

The horizontal frame (4) is suitable for moving the holders (8) substantially horizontally up to the vertical frame (5), wherein the vertical frame (5) is suitable for separately moving each holder (8) substantially vertically upwards, wherein the holders (8) are kept in a substantially horizontal position.

In a second aspect, the present invention provides a method for composing a series of satays, wherein each satay consists of a series of food elements (3) which are penetrated by one skewer (2), comprising the following steps: i) placing food items in a series of separate holders (8), wherein each holder (8) is provided with a series of recesses (9) provided with an opening (10) which is suitable for the passage of the skewer (2), and ii) positioning the filled holders (8) parallel with respect to each other and next to each other.

In this case, a series of skewers (2) are simultaneously pushed through the food elements (3) in order to produce a series of satays.

The present invention is advantageous since this limits the need for manual operations, thus making the method quicker, less expensive, less labor-intensive and less cumbersome for the operative and more hygienic due to the reduced contact between the operative and the food elements (3).

In addition, the mechanical load on the device and the skewers (2) is reduced, which makes it possible to achieve an increase in the service life of the apparatus or as a result of which process interruptions due to mechanical breakdown are at least partly avoided.

In addition, the requirements with regard to strength and resistance to breaking by bending of the skewer (2) are reduced, making it possible to use less expensive skewers (2).

DESCRIPTION OF THE FIGURES

The explicit characteristics, advantages and objectives of the present invention will become clear to the specialist in the technical field of the invention after reading the following detailed description of the embodiment of the invention and of the attached figures, in which.

DETAILED DESCRIPTION OF THE INVENTION

Figure 1:
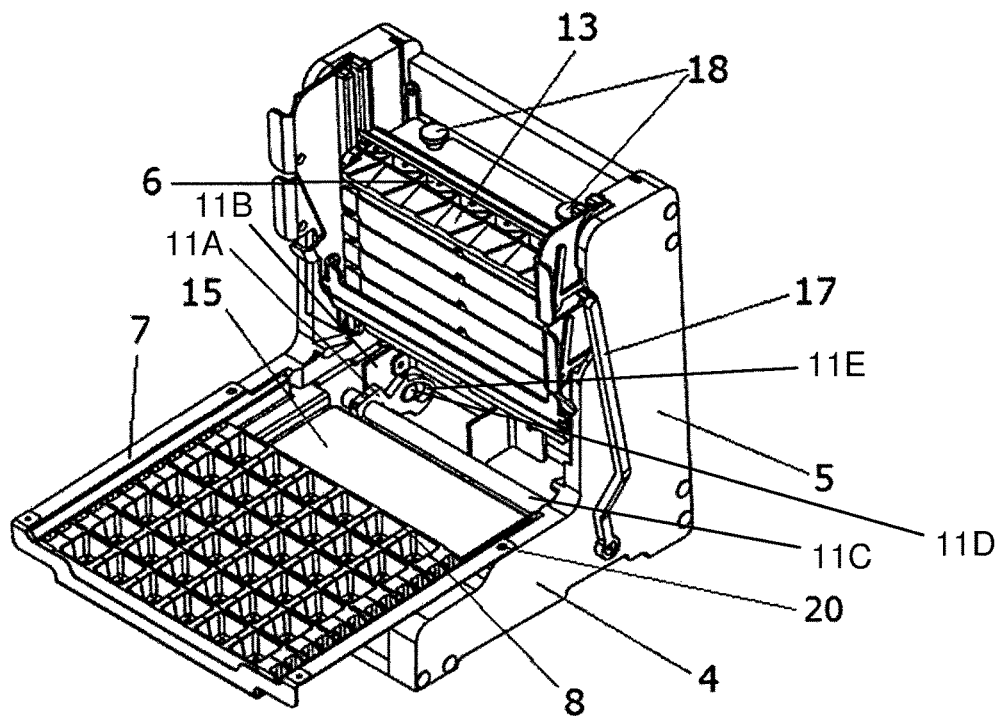
FIG. 1 shows a perspective view of a satay machine.

Unless specified otherwise, all terms used in the description of the invention, including technical and scientific terms, are to be understood in the way that they would be understood by a specialist in the technical field of the invention.

The examples indicated serve to illustrate the arrangement, method and systems of the present invention and cannot be interpreted as a limitation of the invention.

As used in the description of the present invention, the meaning of the following terms is as described below.

In this document, "a", "an" and "the" refer both to the singular and the plural, unless the context clearly indicates otherwise. For example, "a segment" means one or more than one segment.

Where "approximately" or "circa" is used in this document in connection with a measurable variable, a parameter, a time period or a moment in time and the like, variations of +/−20% or less, preferably +/−10% or less, more preferably +/−5% or less, still more preferably +/−1% or less, and even more preferably +/−0.1% or less than the quoted value are meant, in so far as such variations apply to the invention described. However, this means that the value of the variable to which the term "approximately" or "circa" refers, is itself mentioned explicitly.

The terms "comprise", "comprising", "consist of", "consisting of", "provided with", "contain", "containing", "involve", "involving", "signify", "signifying" are synonyms and are inclusive or open terms which indicate the presence of that which follows, and which do not exclude or prevent the presence of other components, characteristics, elements, limbs, steps, known from or described in the prior art.

Indicating numerical intervals by means of the end points comprises all integers, fractions and/or real numbers between the end points, including these end points.

The terms "food", "food elements", "food items", "food piece", "food pieces", "piece of food" or "pieces of food" have to be understood as being synonyms of each other and refer to any piece of food which can be penetrated by a skewer (2), such as, but not limited to, beef, chicken, pork, horse, goat, mutton, fish, scampi, potato, onion, pepper, cucumber, tomato and chili peppers. The food may have a round, angular or irregular base and may have a cube-shaped, beam-shaped, spherical, disc-shaped or flake-shaped body or an irregular body.

In addition, satays may be produced by pushing other food items onto a skewer (2), such as for example sweets, cheese, fruit and the like.

In a further addition, satays may be produced by pushing non-edible items which can be penetrated onto a skewer (2), such as for example, but not limited to, flowers.

The term "skewer" or "spit" is synonymous with the term "pin" and has to be understood as meaning an elongate object, the length of which is at least ten times the diameter and at least one end of which is pointed. In addition to a pointed end, a skewer (2) may also have a second, non-pointed end which may be straight, curved, sickle-shaped or circular round. The cross section of a skewer (2) may be round or angular. The tip of a skewer (2) may be round or angular. A skewer (2) is made of a material such as, but not limited to, wood or stainless steel. The length of the skewer (2) is between 5 cm and 250 cm. Preferably, the length of the skewer (2) is between 10 cm and 100 cm. Most preferably, the length of the skewer (2) is between 13 cm and 40 cm. The diameter of the skewer (2) is between 0.5 mm and 10 mm. Preferably, the diameter of the skewer (2) is between 1 mm and 4 mm.

The term "satay" is synonymous with the term "satays" and is to be understood as meaning a dish consisting of at least three pieces of food which are arranged next to each other on a skewer (2) and with the food elements (3) being penetrated by the skewer (2) at an arbitrary location, but preferably centrally.

A "frame" is synonymous with the term "supporting framework", "framework" or "support structure" and is to be understood as meaning a rectangular device with provisions for fitting or mounting auxiliary means or provisions, or another frame. In this case, fitting or mounting is to be understood as meaning fixing using auxiliary means, such as for example, but not limited to, nails, screws or magnets, but also chemically fastening by means of gluing, or as a result of the fact that the frame and the provision or another frame are made in one piece, as a result of which the forces at the molecular or atomic level are responsible for the specific, functional shape.

A frame may be made from plastic material, such as for example, but not limited to, polyethylene, polypropylene, polyvinyl chloride or alloys of plastics or from a metal-based material, such as, for example, but not limited to, steel, stainless steel or steel alloys.

The terms "move up", "press up" and "push up" are used as synonyms of one another, as are the terms "move-up mechanism", "push-up mechanism" and "press-up mechanism", and relate to the operation of pushing up a food element, for example, but not limited to, vertically upwards, wherein the food element can be penetrated by a skewer (2).

The term "operative" is used to denote one or several persons who operate the device as described herein in order to produce satays.

In a first aspect, the present invention provides a device for composing a series of satays, being a series of food elements (3) penetrated by a skewer (2), comprising:

a series of separate holders (8), wherein each holder (8) is provided with a series of recesses (9) which are suitable for temporarily accommodating a food element meanwhile, and a horizontal frame (4) and a vertical frame (5).

The horizontal frame (4) is a frame which is placed mainly horizontally and the vertical frame (5) is a frame which is placed mainly vertically. The vertical frame (5) may be mechanically bonded to the horizontal frame (4) or may be bonded to the horizontal frame (4) as part of an identical shape.

The horizontal frame (4) can move the holders (8) substantially horizontally up to the vertical frame (5), in which case the vertical frame (5) can move each holder (8) separately substantially vertically upwards, wherein the holder (8) is kept in a substantially horizontal position.

Figure 2:
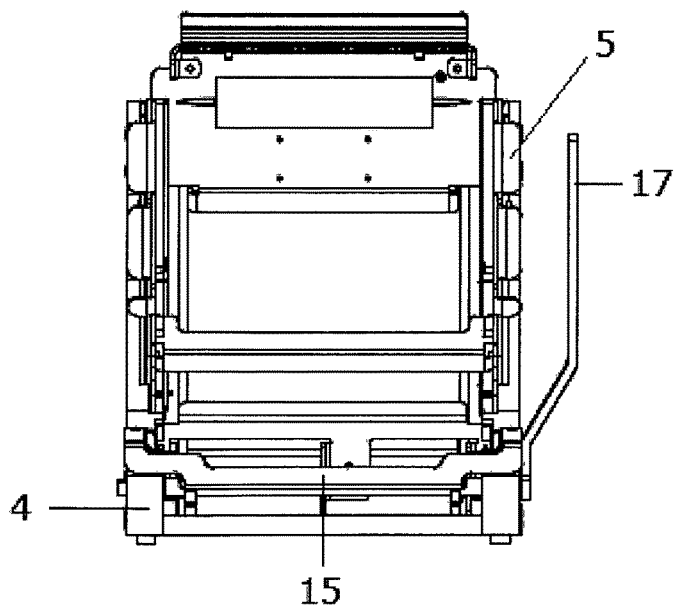
FIG. 2 shows a front view of a satay machine.
Figure 3:
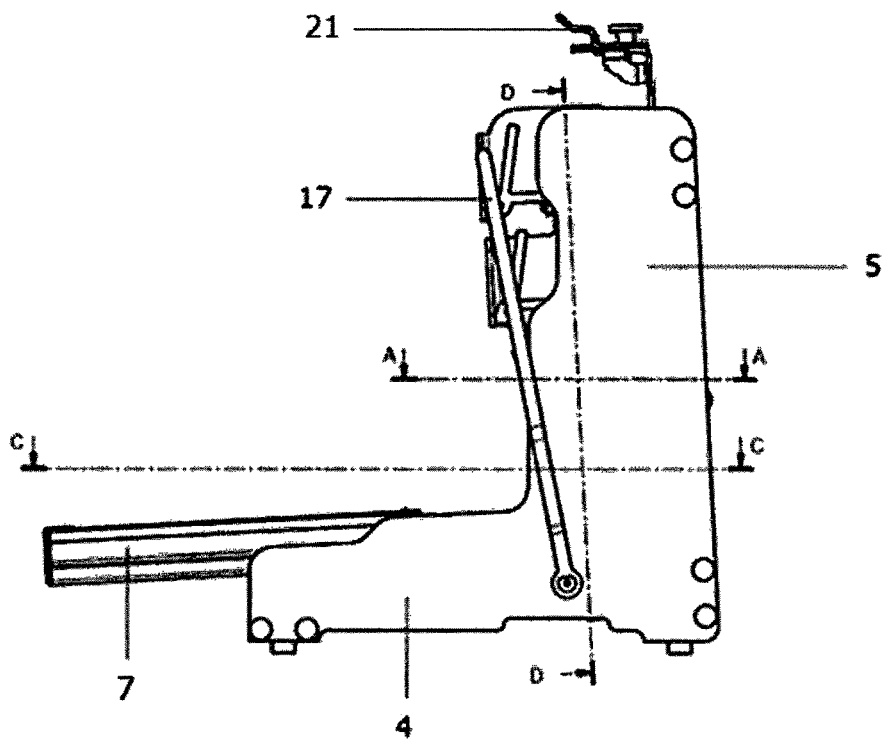
FIG. 3 shows a side view of a satay machine.

Various views of a preferred embodiment of the present invention are illustrated in FIGS. 1-3.

FIG. 1 is a diagrammatic representation of a perspective view of a satay machine in an embodiment according to the present invention in which the following parts are denoted as follows: horizontal frame (4), vertical frame (5), clamping slat for a series of skewers (6), serving plate (7), holder for food elements (8) with recesses (9), entrainment slat (13), platform (15), operating handle (17), securing means for clamping slat (18) and securing means for the serving plate (20).

FIG. 2 is a diagrammatic representation of a front view of a satay machine in an embodiment according to the present invention in which the following parts are denoted as follows: horizontal frame (4), vertical frame (5), platform (15) and operating handle (17).

FIG. 3 is a diagrammatic representation of a side view of a satay machine in an embodiment according to the present invention in which the following parts are denoted as follows: horizontal frame (4), vertical frame (5), serving plate (7) and operating handle (17).

In this case, the serving plate (7) is placed on a platform (15) which is enclosed by the horizontal frame (4), with one or several provisions for fixing the serving plate onto the platform (15). The fixing is preferably achieved by means of, but not limited to, screws or clamps. Several holders (8) are arranged on the serving plate (7) parallel next to one another. The vertical frame (5) comprises the clamping slat (6) for a series of skewers (2), an operating handle, and securing means for the clamping slat, in which case the fixing is preferably achieved by means of, but not limited to, screws or clamps.

In an alternative preferred embodiment of the present invention, the serving plate (7) is accommodated in the horizontal frame (4) by clamping the serving plate in the horizontal frame (4).

In a preferred embodiment, the present invention provides a device for composing a series of satays, wherein the horizontal frame (4) is provided with a push-up mechanism, operable by means of a handle, for vertically pushing up one separate holder (8) into the vertical frame (5), wherein the separate holder (8) remains mainly horizontal.

In a more preferred embodiment, the push-up mechanism is provided with a handle which is intended to exert a lever effect and to thus limit the mechanical effort of the operative which is required for pushing up the food element.

In a preferred embodiment, the present invention provides a device for composing a series of satays, wherein the horizontal frame (4) is suitable for the placement of a serving plate (7), being a plate suitable for arranging a series of separate holders (8), wherein the horizontal frame (4) is provided with clamping or securing means for said serving plate (7). Such a serving plate (7) is illustrated in FIG. 3.

In a preferred embodiment, the present invention provides a device for composing a series of satays, wherein a clamping slat (6) is provided at the top of the vertical frame (5), suitable for positioning and fixing one or several skewers (2), wherein said clamping slat (6) can be fixed to said vertical frame (5) at an adjustable height.

In a preferred embodiment, the clamping slat (6) can be fixed on the vertical frame (5) by means of one or several screws.

In a preferred embodiment, the height of the clamping slat (6) can be adjusted by mounting a resilient pin into the openings in the vertical frame (5) which have been provided therefor.

In a preferred embodiment, the vertical frame (5) is provided with a resistance plate (21), as is illustrated in FIG. 3, which is fixed to the vertical frame, preferably by screw clamps, wherein the resistance plate (21) is positioned above the clamping slat, at a distance of at most 20 cm above the clamping slat and as a result of which the vertical movement of the skewer in the upward direction is limited. More preferably, the resistance plate (21) is positioned above the clamping slat at a distance of at most 10 cm above the clamping slat. Most preferably, the resistance plate (21) is positioned above the clamping slat at a distance of at most 5 cm above the clamping slat.

In a preferred embodiment, said resistance plate (21) is provided with a first and a second? side, in which case the provisions for the screw clamps are provided asymmetrically across the width in order to prevent said resistance plate (21) from undesirably being positioned incorrectly. Preferably, said resistance plate (21) can be fixed onto said device in two ways, with the distance of the resistance plate (21) to the clamping slat being variable.

Figure 12:
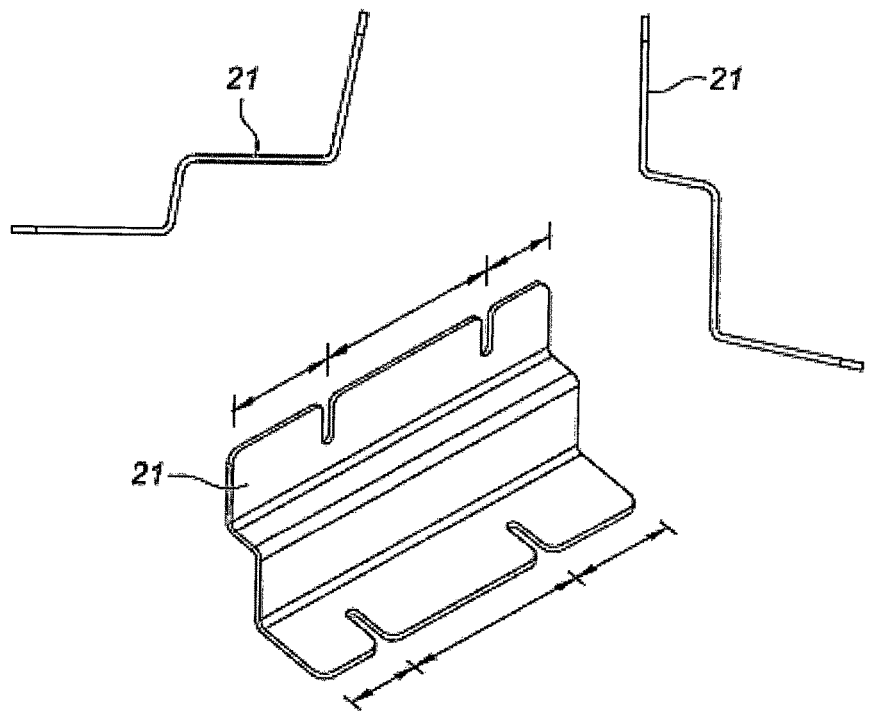
FIG. 12 shows a resistance plate (21) in side view (at the top) and in perspective (at the bottom) in detail.

FIG. 12 shows a resistance plate (21) in side view (at the top) and in perspective (at the bottom) in detail.

A clamping for a skewer is understood to mean a means which is suitable for clamping a skewer (2).

In a more preferred embodiment of the present invention, a clamping for a skewer is a recess in a plate which is made from a flexible or elastic material, such as, but not limited to, rubber, in which case the width of the recess in the plate is smaller than the smallest diameter of the skewer (2) and as a result of which, due to the friction forces and the normal forces occurring between the skewer (2) and plate, the freedom of movement of the skewer (2) is limited.

The holder for food elements (8) consists of several cups, also referred to as recesses, which are fitted next to one another on one axis. Preferably, the holder (8) comprises 2 to 25 recesses. More preferably, the holder (8) comprises 3 to 12 recesses. Most preferably, the holder (8) comprises 4 to 8 recesses.

Figure 4:
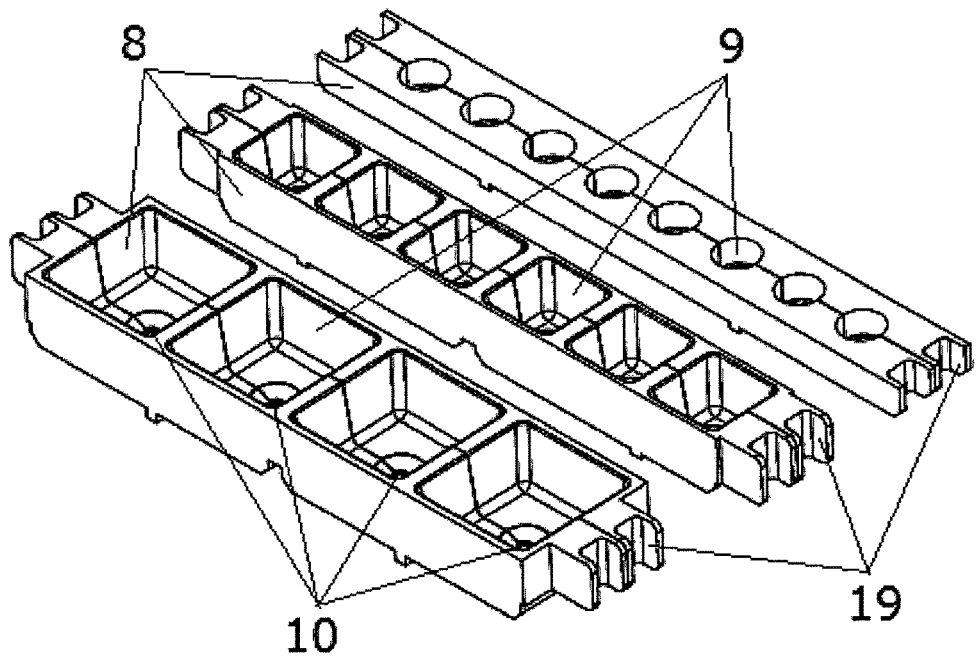
FIG. 4 shows a perspective view of various possible embodiments for a holder for food elements (8)

FIG. 4 shows a diagrammatic representation of a perspective view of various embodiments of a holder for food elements (8) consisting of a series of recesses (9) provided with an opening (10) in the center of the bottom of the recesses (9) with means at both ends of the holder (8) for vertically mounting a portion of the holder (19). FIG. 4 also shows that a different design of the recesses (9) is possible, such as for example cube-shaped and cylindrical. Alternatively, an oval recess (9) is desirable, depending on the shape of the food elements (3).

In a preferred embodiment, the present invention provides a device for composing a series of satays, wherein said recesses (9) are provided with positioning means for positioning said food elements (3) in said recesses (9), wherein said positioning means preferably consist of a plurality of centrally positioned spring elements, wherein said spring elements are preferably spring steel.

Such positioning means comprise, for example, but are not limited to, a plurality of centrally positioned spring steel which clamp a food element (3) as soon as said food element (3) is introduced into said recess (9).

In a preferred embodiment, the present invention provides a device for composing a series of satays, wherein said holder (8) for food elements (3) is provided at the top and/or at the bottom with several spacing elements (23). This offers the advantage that food elements (3) do not become entirely or partly clamped between two or several holders (8) during horizontal mounting of said holders in the device according to the present invention. Preferably, said spacing elements (23) are provided at the top of said holder (8). As a result thereof, the operator can accurately position said one or more food elements (8) with respect to said spacing elements (23), as a result of which the risk of vertical overlap between a food element and the holder during vertical mounting of said holders (8) is significantly reduced. A detailed representation of the abovementioned aspect is illustrated in FIG. 11.

Figure 11:
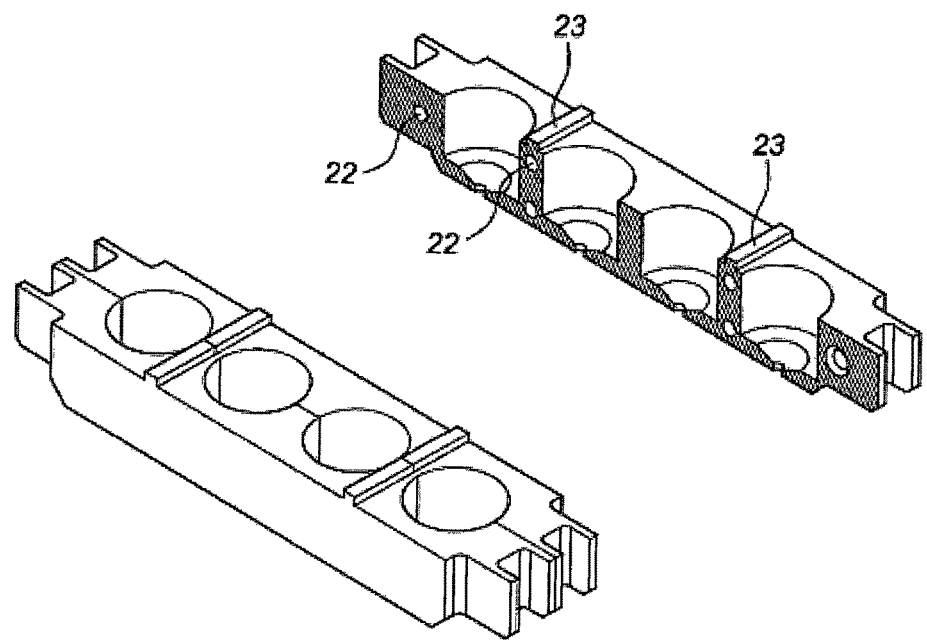
FIG. 11 shows on the left-hand side: a perspective view of a holder (8) according to the present invention, wherein the holder (8) comprises two separate parts; and on the right-hand side: one part of the holder (8) with an indication of the magnets (22) and vertical separating elements (23)

FIG. 11 shows on the left-hand side: a perspective view of a holder (8) according to the present invention, wherein the holder (8) comprises two separate parts; and on the right-hand side: one part of the holder (8) with an indication of magnets (22) and vertical separating elements (23).

An opening (10) is provided centrally in the bottom of the bowl-shaped recess (9), the diameter of which opening is at least as large as the diameter of the skewer (2). Preferably, the diameter of the opening (10) is between 100% and 1000% of the diameter of the skewer (2). More preferably, the diameter of the opening (10) is between 100% and 500% of the diameter of the skewer (2). Most preferably, the diameter of the opening (10) is between 100% and 250% of the diameter of the skewer (2).

The holder (8) comprises two portions which adjoin each other and can be fastened and are separated in the longitudinal direction of the holder (8) along the plane at right angles to the bottom surface of the recess.

The bowl-shaped recess (9) has a width, length and depth which is between 0.5 cm and 10 cm. Preferably, the width, length and depth of the bowl-shaped recess (9) is between 1 cm and 5 cm. More preferably, the width, length and depth of the bowl-shaped recess (9) is between 1.25 cm and 3.5 cm. The width, length and depth of the recess may differ from one another. Preferably, the width, length and depth of the recess are approximately equal.

In a preferred embodiment, the present invention provides a device for composing a series of satays, wherein the vertical frame (5) is provided with an entrainment slat, which is suitable for limiting the transverse bending of the skewer (2) which is mounted so as to be vertically movable.

In a more preferred embodiment, the entrainment slat is positioned between the rubber clamping at the top end of the skewer (2) and at a distance, preferably at approximately ¼ part of the total length of the skewer (2), from the bottom end of the skewer (2).

In a preferred embodiment, the entrainment slat is provided with openings which are suitable for allowing said several skewers (2) which are arranged in a straight line and fixed in the rubber clampings to pass through, with the openings being provided vertically underneath the clampings of the skewers (2).

Figure 5:
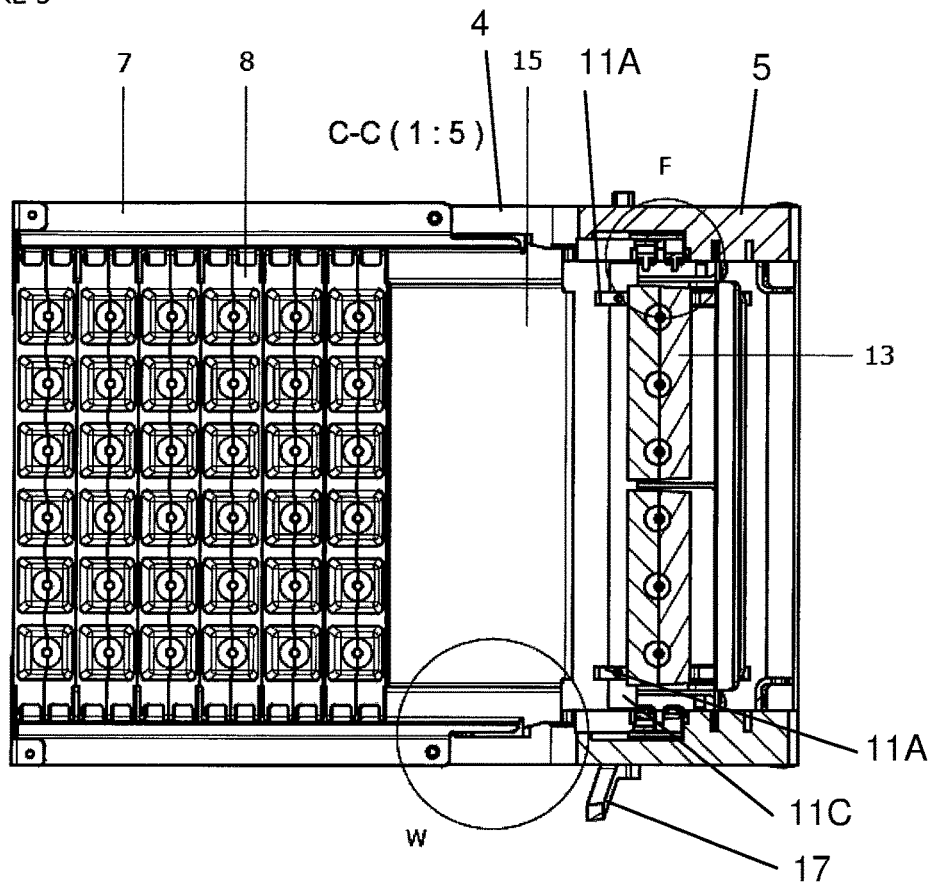
FIG. 5 shows a top view in the plane C-C of a satay machine.

FIG. 5 is a diagrammatic representation of a top view in the plane C-C of a satay machine according to the present invention in which the following parts are denoted as follows: serving plate (7), holder for food elements (8), entrainment slat (13) and platform (15).

In a preferred embodiment, the present invention provides a device for composing a series of satays, wherein means are provided on the inner side of the vertical frame (5) to prevent a spontaneous downward movement of the holder (8).

Figure 6:
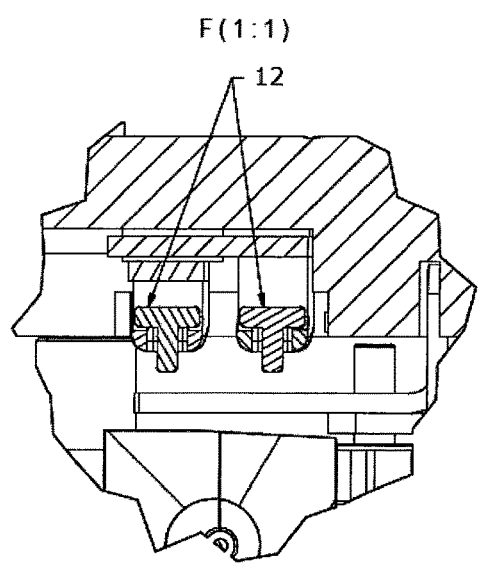
FIG. 6 shows a detail view of a cross section F in the plane C-C of a satay machine.

FIG. 6 is a diagrammatic representation of a detail view of a cross section F in the plane C-C of a satay machine in an embodiment according to the present invention in which means for preventing the holders (12) from sliding back are indicated, being barbs.

Mounting said barbs on the transverse side of the vertical frame (5) of the satay machine has the advantage that the risk of damage or defects due to mechanical pushing or striking is limited, as a result of which process interruptions and non-availability of the device are prevented.

In a preferred embodiment, the present invention provides a device for composing a series of satays, wherein the horizontal frame (4) is provided with an extending fork which is suitable for positioning a serving plate (7) with a series of separate holders (8).

The platform (15) is an approximately rectangular plate preferably made from, but not limited to, stainless steel, which is suitable for sorting one or more holders (8) with pieces of food. The holders (8) have to be placed in such a way that the longitudinal axis of the holder (8) runs parallel to the axis formed by the first and the second frame, and that the opening (10) of the bowl-shaped recess (9) is directed away from the platform (15).

Preferably, 2 to 25 holders (8) can be placed on the platform (15) one behind the other. More preferably, 3 to 12 holders (8) can be placed on platform (15) one behind the other. Most preferably, 4 to 8 holders (8) can be placed on the platform (15) one behind the other.

The length of the platform (15) is between 10 cm and 150 cm. Preferably, the length of the platform (15) is between 15 cm and 100 cm. More preferably, the length of the platform (15) is between 25 cm and 35 cm. The width of the platform (15) is between 10 cm and 150 cm. Preferably, the width of the platform (15) is between 15 cm and 100 cm. More preferably, the width of the platform (15) is between 25 cm and 75 cm.

The platform (15) is provided with an extending fork which is mounted in the plane of the platform (15) and comprises a plate which can adjoin the platform (15), as a result of which the surface of the platform (15) on which the holders (8) can be positioned is increased. Preferably, the surface of the platform (15) is increased by 10% to 1000%. More preferably, the surface of the platform (15) is increased by 25% to 500%. Most preferably, the surface of the platform (15) is increased by 50% to 100%.

In a preferred embodiment, the present invention provides a device for composing a series of satays, wherein the holders (8) comprise two portions which can be separated from one another, preferably in the longitudinal direction of the holder (8).

FIG. 4 is a diagrammatic representation of a perspective view of various embodiments of a holder for food elements (8).

In a more preferred embodiment, the two portions of the holder for food elements (8) can be separated from each other in the longitudinal direction of the holder (8) in the plane at right angles to the bottom surface of the recess.

In a preferred embodiment, the present invention provides a device for composing a series of satays, wherein the two portions of the holder (8) are each provided separately with means for guiding the holder (8) in the vertical frame (5).

Figure 7:
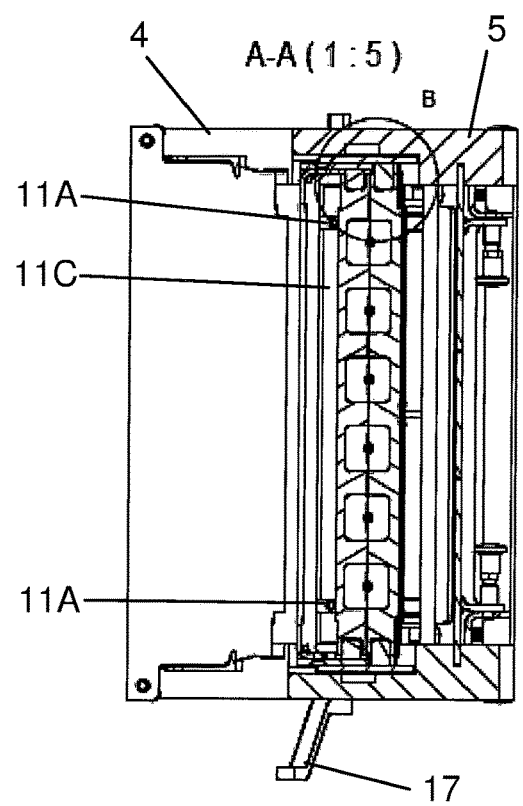
FIG. 7 shows a top view in the plane A-A of a satay machine with an indication of detail cross section B.

FIG. 7 is a diagrammatic representation of a top view in the plane A-A through the vertical frame (5) of a satay machine in an embodiment according to the present invention in which detail cross section B is indicated.

Figure 8:
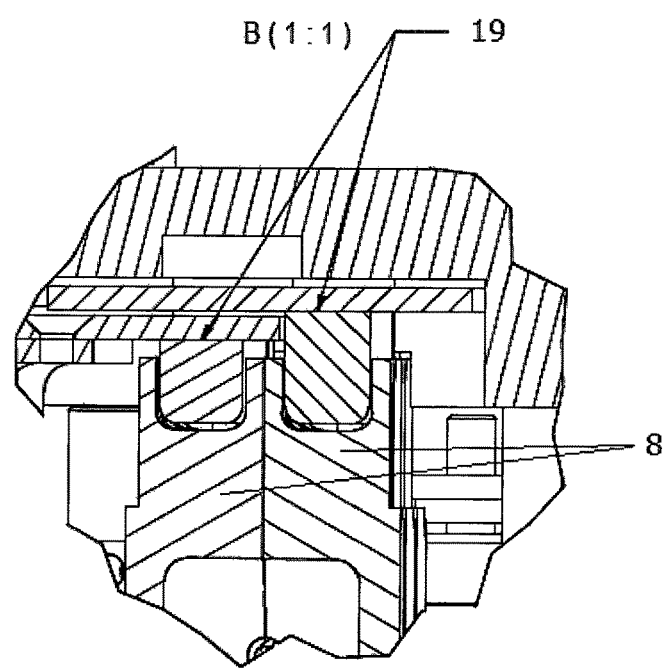
FIG. 8 shows a top view of detail cross section B in the plane A-A of a satay machine.

FIG. 8 is a diagrammatic representation of a top view of detail cross section B in the plane A-A of a satay machine in an embodiment according to the present invention in which a holder for food elements (8) and beam-shaped slats for vertically mounting a portion of the holder (8) in the vertical frame (14) are indicated.

In a preferred embodiment, the present invention provides a device for composing a series of satays, wherein the two portions of the holder (8) can be separated, preferably in a hinged manner.

In a preferred embodiment, the present invention provides a device for composing a series of satays, wherein the two portions of the holder (8) can be held together, preferably by magnets.

Such magnets (22) are shown diagrammatically in FIG. 11. Preferably, said magnets (22) are covered by means of a rustproof layer, such as for example a plastic film or a plastic layer. This offers the advantage that said magnets are protected against corrosion resulting from contact between aqueous liquids and magnets which are susceptible to corrosion during use of said device in compiling satays.

Figure 9:
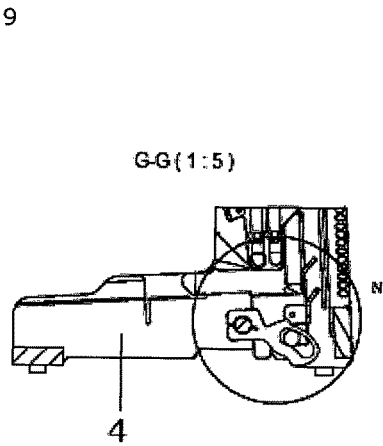
FIG. 9 shows on the left-hand side: a side view of the inner side of a satay machine; and on the right-hand side: a detail cross section N of a side view of the inner side of a satay machine with push-up mechanism (11) in the downward position.
Figure 9:
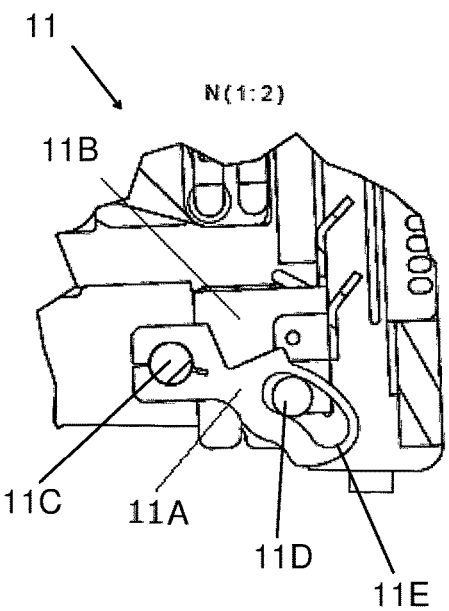
Figure 10:
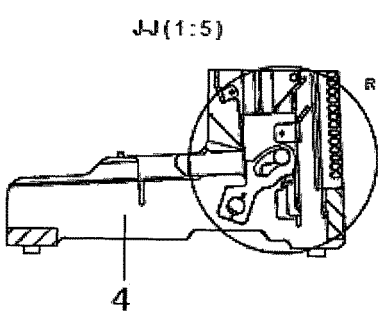
FIG. 10 shows on the left-hand side: a side view of the inner side of a satay machine; and on the right-hand side: a detail cross section R of a side view of the inner side of a satay machine with push-up mechanism (11) in the upward position.
Figure 10:
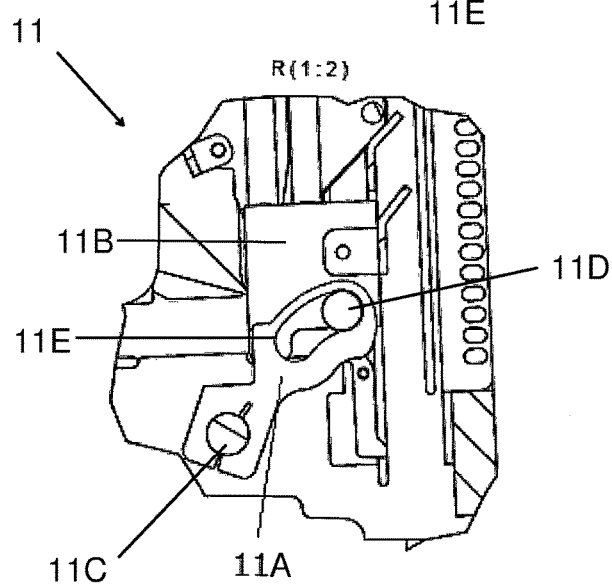

FIGS. 9 and 10 offer a side view of the components which make it possible to push up the holders (8) into the vertical frame (5). FIG. 9 illustrates the push-up mechanism (11) in the downward position. FIG. 10 illustrates the push-up mechanism (11) in the upward position. The push-up mechanism (11) in FIGS. 9 and 10 are illustrated without a holder (8) received thereon such that the respective positions of the components of the push-up mechanism (11) may be illustrated in the upward and downward positions.

The push-up mechanism (11) comprises a lever arm (11A), a holder engaging flange (11B) and a connector (11C). The connector (11C) is connected to the handle (17) such that rotation of the handle (17) causes rotation of the lever arm (11A). In some configurations, a lever arm (11A) may be attached to the connector (11C) on opposite sides of the horizontal frame (4) and a holder engaging flange (11B) may be engaged with each lever arm (11A), as shown in FIGS. 5 and 7. In operation, rotation of the handle (17) causes rotation of the lever arm (11A), via the connector (11C), which causes the lever arm (11A) to push the holder engaging flange (11B) upward. Accordingly, to push up a holder (8) from the horizontal frame (4) to the vertical frame (5), a holder (8) is positioned on top of the holder engaging flanges (11B) and rotation of the handle (17) by an operative causes the holder engaging flange (11B) to push the holder (8) upward from the horizontal frame (4) to the vertical frame (5).

The lever arm (11A) and the holder engaging flange (11B) are connected by a pin (11D) that extends horizontally from the holder engaging flanges (11B) in a direction toward the lever arm (11A). The pin (11D) is received within an arcuate slot (11E) that is formed within the lever arm (11A). In operation, rotation of the lever arm (11A) causes the lever arm (11A) to push the pin (11D) upward which then causes the holder engaging flanges (11B) to be pushed upward. Accordingly, a holder (8) that is positioned on top of the holder engaging flanges (11B) is also pushed upward.

FIG. 9 shows on the left-hand side: a side view of the inner side of the vertical frame (5) in a cross section G-G which runs through the center of the device of a satay machine in an embodiment according to the present invention with an indication of detail cross section N and horizontal frame (4); and on the right-hand side a detail cross section N of a side view of the inner side of the vertical frame (5) in a cross section G-G which runs through the center of the device of a satay machine in an embodiment according to the present invention with an indication of the holder engaging flanges (11B) for holder for food elements (8) and push-up mechanism (11) in the downward position.

FIG. 10 shows on the left-hand side: a side view of the inner side of the vertical frame (5) in a cross section J-J which runs through the center of the device of a satay machine in an embodiment according to the present invention with an indication of the detail cross section R and horizontal frame (4); and on the right-hand side a detail cross section R of a side view of the inner side of the vertical frame (5) in a cross section J-J which runs through the center of the device of a satay machine in an embodiment according to the present invention with an indication of the holder engaging flanges (11B) for holder for food elements (8) and push-up mechanism (11) in the upward position.

As a result of the rounded shape of the press-up mechanism (11), as illustrated in FIGS. 9 and 10, a holder for food elements (8) can be pushed up, in which case the horizontal position of the holder (8) is maintained, as a result of which the recess of each portion of the two-part holders (8) are pushed over the beam-shaped slats.

In a preferred embodiment, the means for vertical guiding or mounting (14) for the two-part holders for food elements (8) are pivotably mounted separately from one another in the horizontal (4) or vertical frame (5).

In a more preferred embodiment, the means for vertical guiding or mounting (14) for the two-part holders for food elements (8) are pivotably mounted separately from one another in the horizontal (4) or vertical frame (5) and separately operable by means of a handle for pivotably tilting said means for guiding or mounting (14) for the two-part holders for food elements (8).

This has the advantage that the satays in the entrainment slat can readily be removed from the device by tilting a front pair of means for the vertical guiding or mounting (14) for the two-part holders for food elements (8).

This has the additional advantage that the two-part holders for food elements (8) can readily be removed from the device by tilting both pairs of means for vertical guiding or mounting (14) for the two-part holders for food elements (8).

In a preferred embodiment, the present invention also provides a device with a pin which is pushed in by a holder for food elements (8) by the operative pushing the holder for food elements (8), as a result of which the operating handle (17) is unlocked and the holder for food elements (8) is displaced vertically upwards by the press-up mechanism (11).

In a second aspect, the present invention provides a method for composing a series of satays, wherein each satay consists of a series of food elements (3) which are penetrated by one skewer (2), comprising the following steps: i) placing food elements in a series of separate holders (8) wherein each holder (8) is provided with a series of recesses (9) provided with an opening (10) which is suitable for the passage of the skewer (2), and ii) positioning the filled holders (8) mutually parallel next to one another.

A series of skewers (2) are pushed simultaneously through the food elements (3) in order to produce a series of satays.

In a preferred embodiment, the present invention provides a method for composing a series of satays, wherein the food elements which are comprised in one satay are skewered sequentially.

In a preferred embodiment, the present invention provides a method for composing a series of satays, wherein food elements which are comprised in a series of satays are skewered simultaneously.

In a preferred embodiment, the present invention provides a method for composing a series of satays, also comprising the following steps: i) arranging a series of holders (8) on a serving plate (7) and ii) positioning said serving plate (7) on the horizontal frame (4) of the device.

The invention claimed is:

1. A device for composing a series of satays, comprising:
   a row of satay holders, wherein each of the satay holders is provided with a series of recesses configured to at least temporarily accommodate a food element;
   a horizontal frame and a vertical frame fixed to each other;
   a handle; and
   a push-up mechanism provided at a junction between the horizontal and the vertical frame, the push-up mechanism comprising:
      a lever arm comprising an arcuate slot;
      a connector configured to connect the handle and the lever arm such that rotation of the handle causes rotation of the lever arm; and
      a flange connected to the lever arm and configured to engage the row of the satay holders, the flange comprising a pin positioned within the arcuate slot such that rotation of the lever arm causes the flange to be pushed upwards,
   wherein the horizontal frame is configured to accommodate the row of the satay holders and allow an operative to move said each of the satay holders substantially horizontally up to the push-up mechanism and in engagement with the flange, wherein the push-up mechanism allows the operative to move said each of the satay holders substantially vertically upwards, wherein said each of the satay holders is maintained in a substantially horizontal position, and wherein rotation of the handle by the operative causes the flange to push said each of the satay holders substantially vertically upwards into the vertical frame such that the row of the satay holders are vertically stacked within the vertical frame.

2. The device according to claim 1, wherein the horizontal frame is configured to support a serving plate comprising a series of separate holders, wherein the horizontal frame is provided with a clamp or a securing device for said serving plate.

3. The device according to claim 1, wherein a clamping slat configured to position and fix one or several skewers is provided at the top of the vertical frame, wherein said clamping slat is fixed to said vertical frame at a height, wherein the height is adjustable.

4. The device according to claim 1, wherein the vertical frame is provided with an entrainment slat mounted, wherein the entrainment slat is vertically movable.

5. The device according to claim 1, wherein retainers are provided on an inner side of the vertical frame to prevent a spontaneous downward movement of said each of the satay holders.

6. The device according to claim 1, wherein said each of the satay holders comprise two portions which are adjoinable and separable from one another.

7. The device according to claim 6, wherein the two portions of said each of the satay holders are each provided separately with guides configured to guide said each of the satay holders in the vertical frame.

8. The device according to claim 6, wherein the two portions of said each of the satay holders are separated.

9. The device according to claim 6, wherein the two portions of said each of the satay holders are held together.

10. The device according to claim 6, wherein the two portions can be separated from one another in the longitudinal direction of the holder.

11. The device according to claim 8, wherein the two portions of said each of the satay holders are separated in a hinged manner.

12. The device according to claim 9, wherein the two portions of said each of the satay holders are held together by magnets.

* * * * *